(12) United States Patent
Sato et al.

(10) Patent No.: US 10,310,357 B2
(45) Date of Patent: Jun. 4, 2019

(54) OPTICAL APPARATUS INCLUDING ELASTIC DAMPING MEMBER

(71) Applicant: CANON KABUSHIKI KAISHA, Tokyo (JP)

(72) Inventors: Takehiko Sato, Utsunomiya (JP); Koji Sato, Utsunomiya (JP); Kota Asano, Utsunomiya (JP); Daisuke Shiraishi, Utsunomiya (JP); Makoto Hayakawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 15/435,487

(22) Filed: Feb. 17, 2017

(65) Prior Publication Data

US 2017/0242318 A1    Aug. 24, 2017

(30) Foreign Application Priority Data

Feb. 24, 2016    (JP) .................................. 2016-032706

(51) Int. Cl.
*H04N 5/225*    (2006.01)
*G03B 9/06*    (2006.01)
*H04N 5/232*    (2006.01)

(52) U.S. Cl.
CPC ........... *G03B 9/06* (2013.01); *H04N 5/23287* (2013.01); *H04N 5/23258* (2013.01)

(58) Field of Classification Search
CPC ...................................................... G03B 9/06
USPC ........................................................ 348/335
See application file for complete search history.

(56) References Cited

U.S. PATENT DOCUMENTS

| 4,444,471 A * | 4/1984 | Ford, Jr. ............ G02B 26/0875 359/666 |
| 5,502,524 A | 3/1996 | Bovenzi et al. |
| 7,969,667 B2 | 6/2011 | Sodeyama et al. |
| 2005/0035684 A1* | 2/2005 | Fuse ...................... G02B 7/003 310/311 |
| 2006/0242660 A1* | 10/2006 | Kimura ................ G11B 7/0932 720/681 |

FOREIGN PATENT DOCUMENTS

| JP | 07-181559 A | 7/1995 |
| JP | 2010032902 A | 2/2010 |
| JP | 2010087048 A | 4/2010 |
| JP | 2012194377 A | 10/2012 |

* cited by examiner

*Primary Examiner* — Usman A Khan
(74) *Attorney, Agent, or Firm* — Rossi, Kimms & McDowell LLP (57) ABSTRACT

An optical apparatus includes an optical unit driven by an actuator, a holder configured to hold the optical unit, and an elastic member that contacts the holder via a first contacting portion and a second contacting portion, and contacts the optical unit via a connecting portion provided between the first contacting portion and the second contacting portion. The elastic member is spaced from the holder between the first contacting portion and the second contacting portion, and spaced from the optical unit between the first contacting portion and the connecting portion and between the connecting portion and the second contacting portion. Part of the elastic member opposite to the connecting portion that contacts the optical unit is spaced from the holder.

10 Claims, 7 Drawing Sheets

OPTICAL APPARATUS INCLUDING ELASTIC DAMPING MEMBER

BACKGROUND OF THE INVENTION

Field of the Invention

The present invention relates generally to an optical apparatus, such as a camera and an interchangeable lens, and more particularly to an optical apparatus having an electric type optical unit, such as an electromagnetic diaphragm unit.

Description of the Related Art

An actuator driven optical unit, such as an electromagnetic diaphragm unit, in the above optical apparatus disadvantageously causes the vibrations and finally noises when the vibrations are transmitted in the optical apparatus.

Accordingly, Japanese Patent Laid-Open No. ("JP") 07-181559 discloses a damper member having a buffer surface that always contacts a surface of light-shielding blade and retrains the vibrations caused by the movement of the electromagnetic diaphragm unit or the light-shielding blade.

According to the configuration disclosed in JP 07-181559, the damper member always contacts the surface of the light-shielding blade with frictions, and this contact may prevent a smooth movement of the light-shielding blade.

SUMMARY OF THE INVENTION

The present invention provides an optical apparatus configured to maintain driving of an electric type optical unit, and to prevent vibrations caused by the driving of the optical unit and noises caused by the vibrations.

An optical apparatus according to one aspect of the present invention includes an optical unit driven by an actuator, a holder configured to hold the optical unit, and an elastic member that contacts the holder via a first contacting portion and a second contacting portion, and contacts the optical unit via a connecting portion provided between the first contacting portion and the second contacting portion. The elastic member is spaced from the holder between the first contacting portion and the second contacting portion, and spaced from the optical unit between the first contacting portion and the connecting portion and between the connecting portion and the second contacting portion. Part of the elastic member opposite to the connecting portion that contacts the optical unit is spaced from the holder.

Further features of the present invention will become apparent from the following description of exemplary embodiments with reference to the attached drawings.

DESCRIPTION OF THE EMBODIMENTS

A description will now be given of embodiments according to the present invention.

First Embodiment

Figure 8:
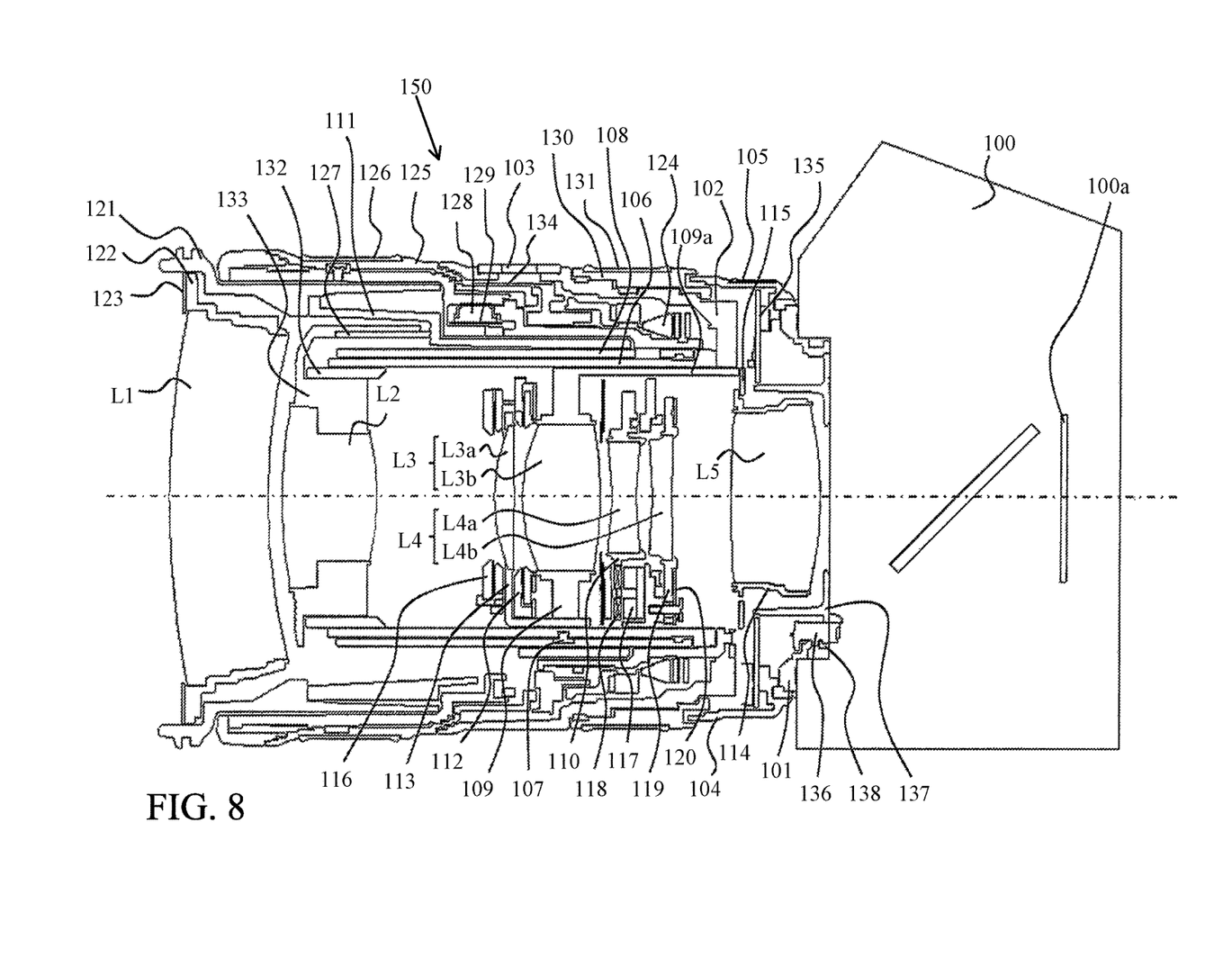
FIG. 8 is a sectional view of an interchangeable lens and a camera according to the first embodiment.

FIG. 8 illustrates a configuration that includes an interchangeable lens 150 as an optical apparatus according to a first embodiment of the present invention, and a single-lens reflex camera (referred to as a "camera" hereinafter) 100 to which the interchangeable lens 150 is detachably attached.

The interchangeable lens 150 includes an image pickup optical system. In the image pickup optical system, L1 denotes a first lens unit, and L2 denotes a second lens unit configured to move in the optical axis direction for focusing. L3 denotes a third lens unit, and L4 denotes a fourth lens unit configured to partially move (shift) in a direction orthogonal to the optical axis direction and to correct an image blur caused by a camera vibration, such as a manual vibration. L5 denotes a fifth lens unit. The first lens unit L1 to the fifth lens unit L5 move in the optical axis direction and provide magnification variations of the image pickup optical system.

The camera 100 includes an image sensor 100a, such as a CCD sensor and a CMOS sensor. The image sensor 100a photoelectrically converts an object image formed by the image pickup optical system and outputs an electric signal. The unillustrated image processor generates an image signal through various processing to the electric signal from the image sensor 100a. The image signal is displayed on an unillustrated display unit provided to the camera 100, or recorded in an unillustrated semiconductor memory that can be ejected from the camera 100.

In the interchangeable lens 150, reference numeral 101 denotes a mount and has a bayonet unit for attachment to the camera 100. The mount 101 is fixed onto a fixture barrel 102 by screws. The fixture barrel 102 is provided with a scale window 103 and an unillustrated switch panel. An autofocus, an image stabilization, and another function can be selected and used by selecting a switch provided on the switch panel. Reference numeral 104 denotes an exterior ring fixed between the mount 101 and the fixture barrel 102. The exterior ring 104 is provided with a name plate 105.

Reference numeral 106 denotes a guide barrel fixed onto the fixture barrel 102 by screws, and forms a base member. A cam barrel 108 is disposed rotatably around the optical axis on the outer circumference of the guide barrel 106. As the cam barrel 108 is rotated, an intersection moves between a guide groove that extends in the optical axis direction in the guide barrel 106 and a cam groove provided in the cam barrel 108. Since an unillustrated cam followers provided in holding frames etc. for holding the first lens unit L1 to the fifth lens unit L5 are engaged with this intersection, each lens unit is moved in the optical axis direction. Similarly, an image blur correction unit (image stabilization unit or vibration proof unit) 110 and a linear barrel 111 are moved in the optical axis direction, because unillustrated cam followers provided to them are engaged with similar intersections.

A 3a-th lens unit L3a as a unit on the object side (front side) in the third lens unit L3 is held by a 3a-th unit holding frame 113, and a 3b-th lens unit L3b as a unit on the image side (backside) in the third lens unit L3 is held by a 3b-th unit holding frame 109.

An electromagnetic diaphragm unit 112 as an electric type optical unit (electric optical unit) includes a diaphragm driver that includes a diaphragm actuator as an actuator, such as a stepping motor, and a diaphragm blade. The electromagnetic diaphragm unit 112 is screwed onto the 3b-th unit holding frame 109 behind the 3a-th holding frame 113. A fifth unit holding frame 114 configured to hold the fifth lens unit L5 is screwed via a fifth unit holding plate 115 onto the back end of a fifth unit extending portion 109a that extends from the 3b-th unit holding frame 109 in the backside direction. A front end of the 3a-th unit holding frame 113 is elastically coupled with a sub diaphragm 116 configured to determine an open aperture diameter and to cut the detrimental light at the front end of the electromagnetic diaphragm unit 112.

The image blur correction unit 110 holds a 4a-th lens unit L4a as a unit located on the object side of the fourth lens unit L4 so that the 4a-th lens unit L4a can move in a direction orthogonal to the optical axis direction (or radial direction). The fourth lens unit L4a is driven in the radial direction by a shift actuator that includes a magnet 117 and a coil 118. A 4b-th unit holding frame 119 configured to hold the 4b-th lens unit L4b as a unit located on the image plane side of the fourth lens unit L4 is screwed onto the back end of the image blur correction unit 110 via a reinforcing plate 120.

A filter frame 121 is screwed onto the linear barrel 111. A bayonet unit is provided on the outer circumference at the front end of the filter frame 121, and a female screw unit is provided at the inner circumference at the front end of the filter frame 121. A hood can be attached to the bayonet unit, and an accessory, such as an optical filter, can be attached to the female screw unit. A first unit holding frame 122 configured to hold the first lens unit L1 is screwed onto the filter frame 121. Each of a contacting portion of the filter frame 121 and a contacting portion of the first unit holding frame 122 has a bevel shapes that extends in the circumferential direction. Thus, by rotating the first unit holding frame 122 and attaching it to the filter frame 121, the attachment position of the first unit holding frame 122 can be selected in the optical axis direction relative to the filter frame 121. This configuration can correct a focus position shift between the wide angle side and the telephoto side caused by the manufacturing error.

Reference numeral 123 denotes a makeup ring printed with a lens name etc. on its front surface. Reference numeral 124 denotes a focus unit screwed onto the guide barrel 106. The focus unit 124 includes a vibration type motor and a differential structure, and outputs a rotation amount of a focus key 127 corresponding to a rotation amount of a rotor in the vibration type motor and a rotation amount of a manual focus ring 125. For example, in the manual focus, the manual ring 125 is rotated and the focus key 127 is rotated. This configuration can move the second lens unit L2 in the optical axis direction and provide an in-focus state.

Reference numeral 126 denotes a focus rubber used to stop sliding and wound around the outer circumference of the manual ring 125.

Screwed on the front side of the focus unit 124 is a gyro substrate 129 mounted with a pair of shake sensors (vibration sensors or gyro sensors) 128 configured to detect angular velocities of the camera vibrations in the horizontal (yaw) direction and the vertical (pitch) direction.

An unillustrated encoder flexible substrate that includes a gray code pattern is bonded onto an outer circumference of the extending portion that extends from the focus unit 124 in an arc shape. A projection is provided on the front side of the focus unit 124 at a phase that has no shake sensors 128 or encoder flexible substrate, and an unillustrated roller is screwed onto this projection.

Reference numeral 130 denotes a zoom operation ring. An unillustrated roller is engaged with a groove in the zoom operation ring 130 which extends in the circumferential direction, and the zoom operation ring 130 is prevented from moving in the optical axis direction while its rotation around the optical axis is permitted. A concave portion is formed in an inner circumference of the zoom operation ring 130, and engaged with an unillustrated zoom key screwed onto the cam barrel 108. This configuration can rotate the cam barrel 108 integrally with the zoom operation ring 130 via the zoom key.

This embodiment disposes the shake sensors 128 distant from the camera 100 (in front of the focus unit 124) in the interchangeable lens. This configuration restrains the vibrations generated by the camera 100, such as vibrations caused when a shutter curtain moves and a mirror moves up and down, from easily transmitting to the shake sensors 128.

Since the zoom operation ring 130 is positioned in the optical axis direction at a phase that has no shake sensors 128, the shake sensors 128 can be disposed without increasing the lens outer diameter. This configuration can reduce the size of the interchangeable lens 150.

Reference numeral 131 denotes a zoom rubber used to stop sliding and wound around the outer circumference of the zoom operation ring 130. An unillustrated zoom brush screwed onto the zoom operation ring 130 slides on the gray code pattern on the encoder flexible substrate, and is used to detect a positional relationship between the zoom operation ring 130 and the encoder flexible substrate.

Reference numeral 132 denotes an inner cam barrel, onto which an unillustrated roller is screwed. This roller is engaged with a cam groove provided in the guide barrel 106 and a linear groove provided in cam groove and cam barrel 108. Thus, the inner cam barrel 132 moves in the optical axis direction integrally with the cam barrel 108 while rotating.

Reference numeral 133 denotes a second unit holding frame configured to hold the second lens unit L2, and the projection provided on its outer circumferential part is engaged with the cam groove provided in the inner circumference of the inner cam barrel 132. A key part that extends from the second unit holding frame 133 is engaged with the focus key 127 so that it rotates integrally with the focus key 127. Thus, as the cam barrel 108 rotates (while the focus key 127 stops), the second unit holding frame 133 moves in the optical axis direction by a total amount of a moving amount of the inner cam barrel 132 in the optical axis direction and a change amount of the engagement point in the optical axis direction associated with a rotation of the cam groove in the inner cam barrel 132.

As the focus key 127 rotates (while the cam barrel 108 stops), the focus key 127 moves while rotating according to the change amount of the engagement point in the optical axis direction with the cam groove in the inner cam barrel 132.

The interchangeable lens 150 according to this embodiment moves the second lens unit L2 in the optical axis direction so as to mechanically correct the focus position shift associated with a change (magnification variation) of a focal length specific to the inner focus using this mechanism.

Reference numeral 134 denotes a scale sheet, configured to rotate together with the focus key 127 as the output of the focus unit 124, and to display the focus position with the scale window 103.

Reference numeral 135 denotes a main substrate, connected electrically with the focus unit 124, the electromagnetic diaphragm unit 112, the image blur correction unit 110, the gyro substrate 129, and the encoder flexible substrate directly or via a flexible wiring plate. A controller, such as a CPU, mounted on the main substrate 135 controls various operations in the interchangeable lens 150. More specifically, the controller drives the focus vibration type motor in accordance with a focus drive command from the camera 100 so as to obtain the in-focus state in the autofocus. In addition, the controller drives the diaphragm actuator in accordance with a diaphragm drive command from the camera 100 so as to automatically adjust the light quantity. The controller controls the shift actuator in accordance with the output from the shake sensor 128, and moves the 4a-th lens unit L4a in the image blur correction unit 110 in the radial direction for the image stabilization.

Reference numeral 136 denotes a contact block screwed onto the mount 101, and connected to the main substrate 135 via the flexible wiring plate. The contact block 136 communicates with the camera 100, and is receives a power supply from the camera 100.

Reference numeral 137 denotes a back lid elastically coupled with the mount 101 and configured to cut the detrimental light. Reference numeral 138 denotes a protective rubber ring elastically coupled with the back lid 137.

Figure 1:
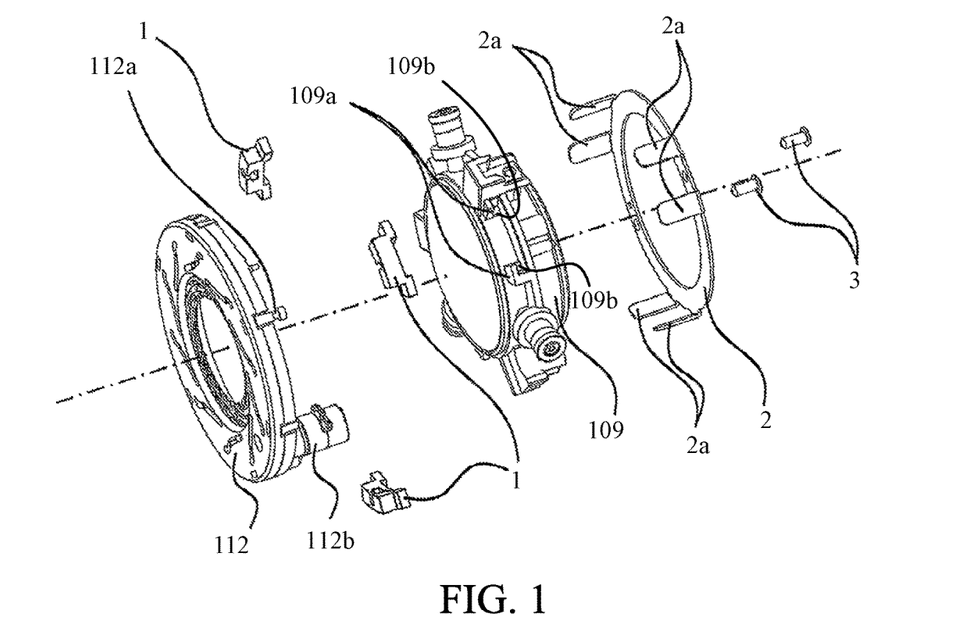
FIG. 1 is an exploded perspective view of a diaphragm unit holding configuration in an interchangeable lens according to a first embodiment of the present invention.
Figure 2A:
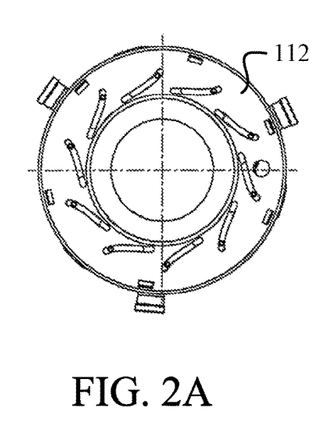
FIGS. 2A to 2C are a front view, a side view, and a back view of the diaphragm unit holding configuration according to the first embodiment.
Figure 2B:
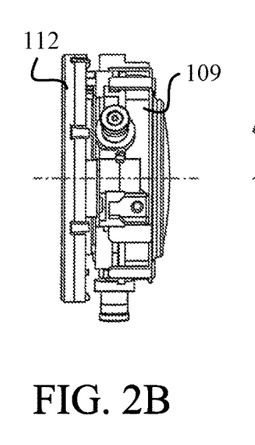
Figure 2C:
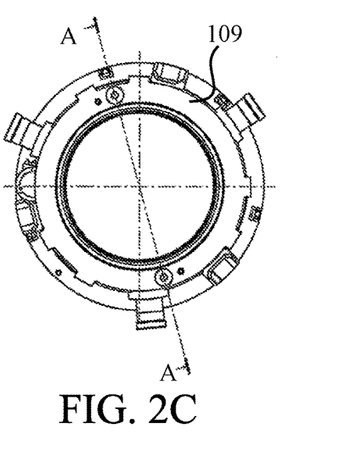
Figure 3:
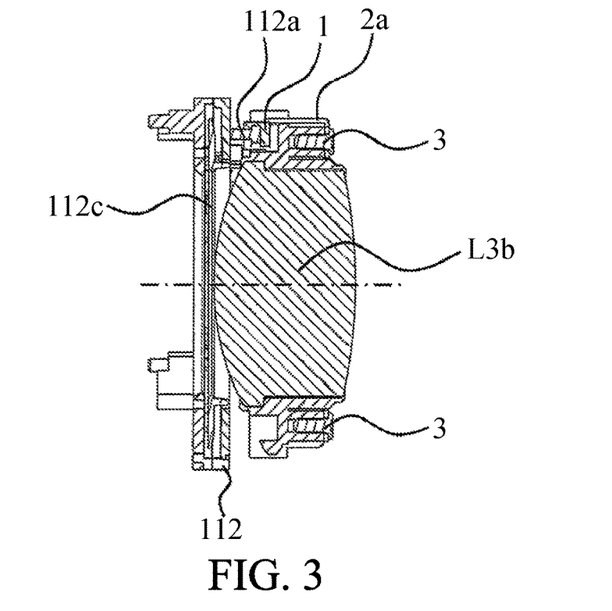
FIG. 3 is a sectional view of the diaphragm unit holding configuration according to the first embodiment.
Figure 5:
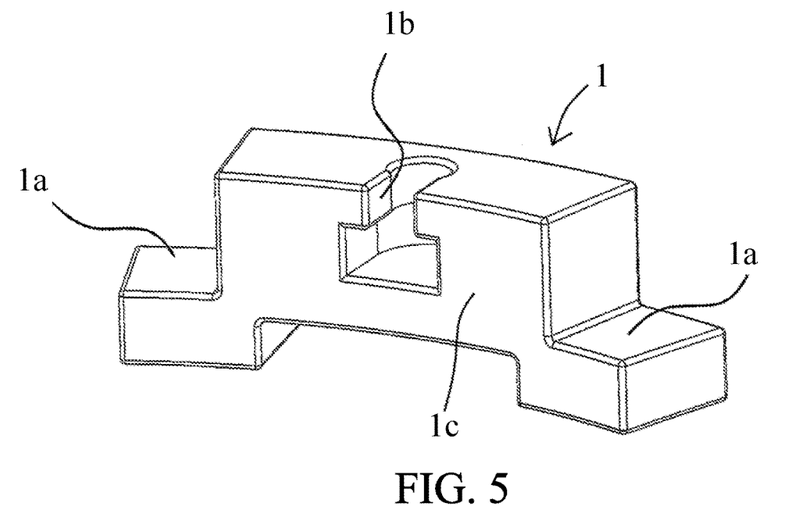
FIG. 5 is a perspective view of a damping rubber used for the first embodiment.

Referring now to FIGS. 1, 2A to 2C, 3 and 5, a description will be given of the diaphragm unit holding structure using the 3b-th unit holding frame 109 as the holder configured to hold the electromagnetic diaphragm unit (simply referred to as the "diaphragm unit" hereinafter) 112. FIG. 1 illustrates the exploded diaphragm unit holding configuration. FIG. 2A illustrates the diaphragm unit holding configuration viewed from the object side, and FIG. 2B illustrates the diaphragm unit holding configuration viewed from the lateral side, and FIG. 2C illustrates the diaphragm holding configuration viewed from the image plane side. FIG. 3 illustrate an A-A section illustrated in FIG. 2C. FIG. 5 illustrates a shape of damping rubber 1, which will be described later.

The diaphragm unit 112 has three connection pins 112a in the circumferential direction, and each connection pin 112 serves as a projection having a tip that has a diameter larger than that of a root part. Each tip part in the three connection pins 112a is inserted into a connecting concave portion (connecting portion) 1b in the three damping rubbers 1 each serving as an elastic member. Each damping rubber 1 has an arc shape that wholly extends in the circumferential direction and disposed at a position that shifts from the optical axis in the perpendicular direction.

The two contacting portions 1a, such as a first contacting portion and a second contacting portion, provided at both ends of each damping rubber 1 in the circumferential direction are radially inserted from the outside into two attachment grooves 109a, such as a first receiving portion and a second receiving portion, that are spaced from each other on the outer circumference of the 3b-th unit holding frame 109. Thereby, each damping rubber 1 is held and prevented from moving in the optical axis direction and in the direction around the optical axis. A beam-shaped flexible member 1c is provided between the two contacting portions 1a in the damping rubber 1 and extends in the circumferential direction. The above connecting concave portion (connecting portion) 1b is provided at the center of the flexible member 1c in the circumferential direction.

Ring part in the rubber pressing member 2 is attached from the backside by two screws 3 to the third unit holding frame 109 configured to hold the three damping rubbers 1. Two extending portions 2a extending to the front side in the optical axis direction are provided at each of three points on the outer circumferential edge of the ring part in the rubber pressing member 2. When the rubber pressing member 2 is fixed onto (coupled with) the 3b-th unit holding frame 109 by the screws 3, each extending portion 2a is disposed so as to shield the inlet portion in the attachment groove 109a from the outside of the attachment groove 109a in the radial direction, and presses the contacting portion 1a in the damping rubber 1. Thereby, the two contacting portions 1a in the damping rubber 1 contact (are held between) the bottom surface of the attachment groove 109a and the extending portion 2a on the inner and outer sides in its radial direction. As a consequence, the damping rubbers 1 (two contacting portions 1a) are held and prevented from moving in the optical axis direction, in the direction around the optical axis direction, and in the radial direction relative to the 3b-th unit holding frame 109. When a first holder represents the third unit holding frame 109, a second holder corresponds to the rubber pressing member 2.

Figure 4:
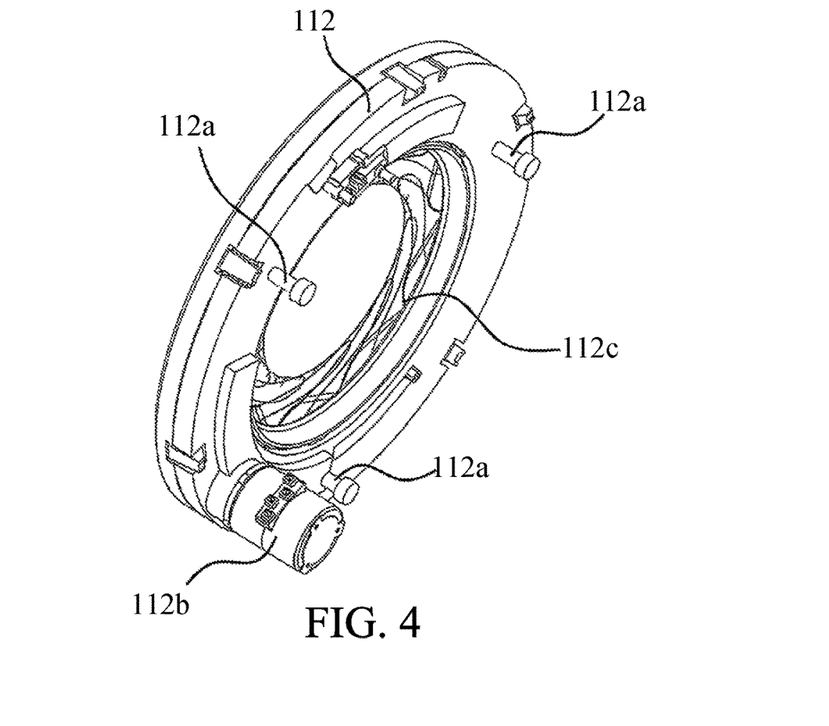
FIG. 4 is a perspective view of a diaphragm unit according to the first embodiment.

FIG. 4 illustrates the diaphragm unit 112. The diaphragm unit 112 includes the diaphragm driver (diaphragm actuator) 112b, and a diaphragm blade unit that includes a plurality of diaphragm blades 112c as light-shielding members. The connection pins 112a are provided on the back surface of the diaphragm unit 112 and project to the backside at three points (at regular angular intervals of 120° around the optical axis) in the circumferential direction, as described later. The three connection pins 112a are distant equally from the optical axis. When the voltage is applied to the diaphragm driver 112b through the unillustrated flexible substrate, the diaphragm blades 112c are opened and closed. Driving the diaphragm blade 112c by the diaphragm driver 112b may cause the vibrations from the diaphragm unit.

Referring now to FIG. 5, a detailed description will be given of a shape of the damping rubber 1, and referring to FIGS. 6A and 6B, a description will be given of a flexion of the damping rubber 1.

As illustrated in FIG. 5, this embodiment arranges the diaphragm unit 112, the damping rubber 1, and the 3b-th unit holding frame 109 in the optical axis direction. As described, the contacting portions 1a are inserted into the attachment grooves 109a provided in the 3b-th unit holding frame 109 at both ends of the damping rubber 1 in the circumferential direction. A beam-shaped flexible member 1c is provided so as to connect these contacting portions 1a in the circumference direction. The contacting portion 1a has a leg shape that projects from the flexible member 1c to the 3b-th lens holding frame 109 in the longitudinal direction and the direction orthogonal to the longitudinal direction.

The connection pin 112a in the diaphragm unit is inserted into (engaged with) the connecting concave portion 1b, and the connecting concave portion 1b is provided at the center of the flexible member 1c in the circumferential direction. Back part of the connecting concave portion 1b on the side of the 3b-th unit holding frame 109 has a width (inner diameter) larger than front part of the connecting concave portion 1b so as to engage with the large diameter tip part of the connecting pin 112a. Thus, when the connection pin 112a is inserted into the connecting concave portion 1b in the radial direction, mutual relative movements are prevented in the optical axis direction and in the radial direction. In other words, the connection pin 112a and the vicinity of the connecting concave portion 1b in the damping rubber 1 can be integrally moved in the optical axis direction or in the radial direction.

This embodiment arranges the damping rubbers 1 at positions equally distant from the optical axis or so as to correspond to the arrangement of the connection pins 112a at three points in the circumferential direction (arranged at regular intervals of 120° around the optical axis). The diaphragm unit is held by the 3b-th unit holding frame 109 via the three damping rubbers 1.

Figure 6A:
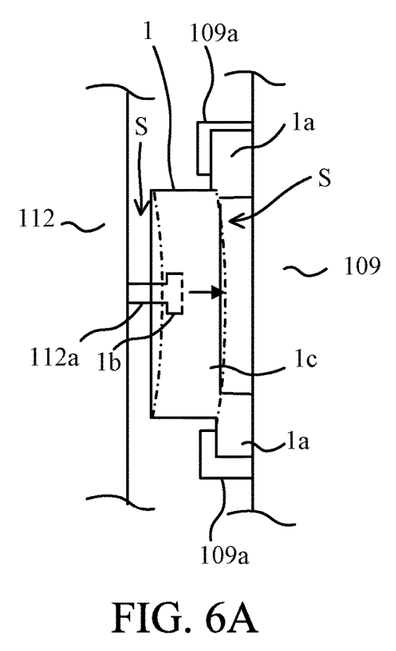
FIGS. 6A and 6B are schematic views for explaining flexion of the damping rubber.

For example, as illustrated in FIG. 6A viewed from the radial direction, when the vibration occurs in the diaphragm unit 112 in the optical axis direction, the vibration transmits to the connecting concave portion 1b in the damping rubber 1 from the connection pin 112a, and bends the flexible member 1c in the damping rubber 1 in the optical axis direction as illustrated by dashed-dotted lines. While FIG. 6A illustrates the flexible member 1c bent to the side of the 3b-th unit holding frame 109, the flexible member 1c can bend to the opposite side. This is because the contacting portion 1a has the above leg shape, and the flexible member 1c (connecting concave portion 1b) is spaced from the diaphragm unit 112 via the connection pin 112a and connected with the diaphragm unit 112. In other words, this is achieved by the space S formed between the flexible member 1c and the 3b-th unit holding frame 109 and the space S formed between the flexible member 1c and the diaphragm unit 112. The flexible member 1c bends, and softly absorbs the vibration of the diaphragm unit 112. Thereby, a high damping effect (vibration attenuation effect) can be obtained.

If the flexible member 1c contacts the 3b-th unit holding frame 109 and the diaphragm unit 112 without these spaces, the flexible member 1c compressively or tensilely deforms and never bends. In this case, the rigidity as the damping rubber 1 is higher than that of this embodiment and a sufficient damping effect cannot be obtained.

Figure 6B:
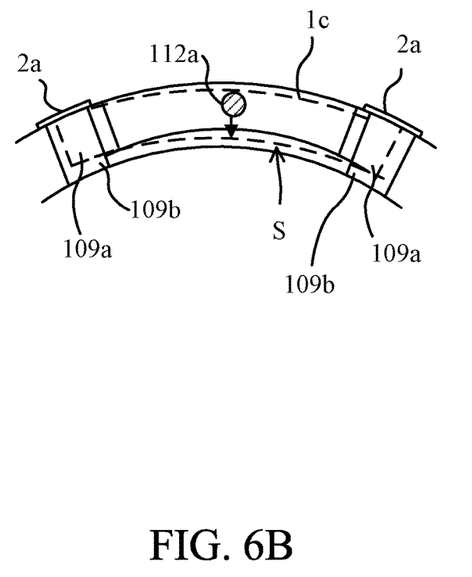

As illustrated in FIG. 6B viewed from the optical axis direction, when the vibration occurs in the diaphragm unit 112 in the radial direction, the vibration transmits from the connection pin 112a to the connecting concave portion 1b in the damping rubber 1, and the flexible member 1c in the damping rubber 1 bends in the radial direction as illustrated by broken lines. While FIG. 6B illustrates the flexible member 1c bent to the side of the inside in the radial direction, the flexible member 1c can bend to the outside in the radial direction. This is achieved by the space S formed between the flexible member 1c and the 3b-th unit holding frame 109 and the space S formed outside of the flexible member 1c in the radial direction. A stage 109b that contacts the contacting portion 1a is formed in the attachment groove 109a provided in the 3b-th unit holding frame 109 so as to form the space S between the flexible member 1c and the 3b-th unit holding frame 109.

Thus, the damping rubber 1 includes two leg-shaped contacting portions 1a that contact the 3b-th unit holding frame 109 at mutually different positions, and the flexible member 1c that is distant via the space S from the 3b-th unit holding frame 109 and the diaphragm unit 112 between these contacting portions 1a. The damping rubber 1 includes the connecting concave portion 1b coupled to the diaphragm unit 112 (connection pin 112a) at a different position as the position of the contacting portion 1a in the longitudinal direction in which the flexible member 1c extends.

Figure 7:
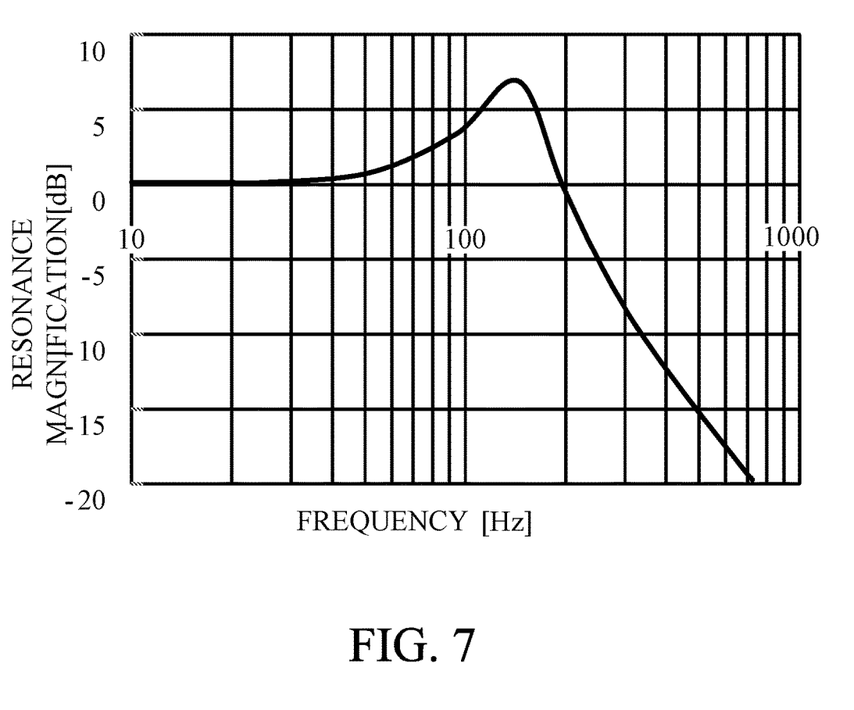
FIG. 7 is a graph of a vibration transmission characteristic of the damping rubber used for the first embodiment.

FIG. 7 illustrates a vibration transmission characteristic of the damping rubber 1. The resonance magnification (which is an amplitude magnification in the resonance to a flexion amount) becomes sufficiently reduced or equal to or lower than −20 dB when the damping rubber 1 is used for a range of 1000 Hz or higher to which the human is generally acoustically highly sensitive, and the damping rubber 1 provides a high damping effect. A Q value for amplifying the vibration is located near 150 Hz and about 7 dB. However, a human audibility is less sensitive to a range of 200 Hz or lower, and this Q value does not prevent the noise reduction. Thus, the damping rubber 1 has a resonance magnification to a frequency higher than 200 Hz, which is smaller than that to a frequency lower than 200 Hz.

A material used for the damping rubber 1 may be, for example, butyl rubber and nitrile rubber. The shape of the damping rubber 1 is properly selected and the material may be selected in accordance with its own weight of the diaphragm unit 112. Thereby, the damping rubber 1 elastically deforms due to the own weight of the diaphragm unit 112 in the non-vibration state, and the diaphragm unit 112 is prevented from moving in the optical axis position, and a high damping effect can be obtained in the vibration state.

This embodiment disposes the damping rubber 1 so that it is aligned with the diaphragm unit 112 and the 3b-th unit holding frame 109 in the optical axis direction. This configuration can prevent the interchangeable lens 150 from increasing its size in the radial direction, and provide the damping rubber 1 having a high damping effect.

Second Embodiment

Figure 9A:
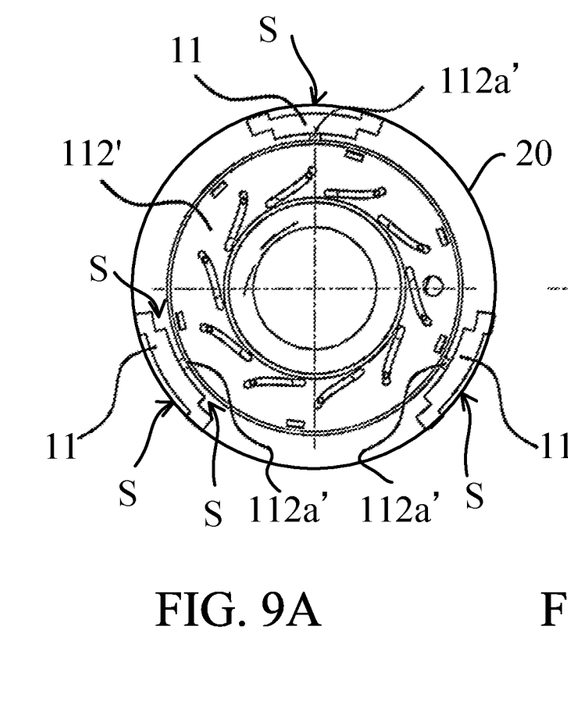
FIGS. 9A to 9C are a front view, a side view, and a back view of a diaphragm unit holding configuration according to a second embodiment.
Figures 9B, 9C:
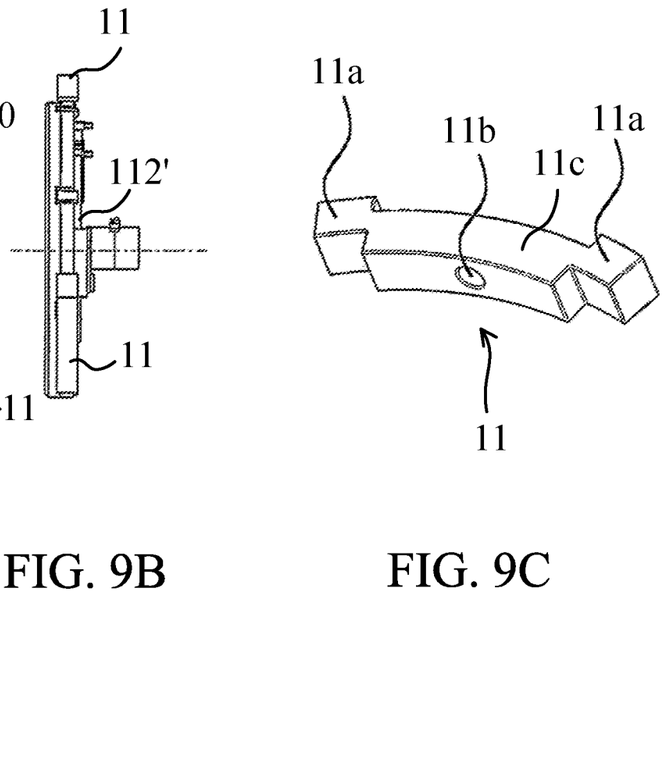

FIGS. 9A and 9B illustrate a diaphragm unit holding configuration according to a second embodiment of the present invention. In FIGS. 9A and 9B, a basic structure of a diaphragm unit 112' is the same as that of the diaphragm unit 112 according to the first embodiment. However, this embodiment provides three connection pins 112a' at three points arranged at regular intervals in the circumferential direction on the outer circumference surface of the diaphragm unit 112' so that these connection pins 112a' project to the outside in the radial direction. Damping rubbers 11 are arranged at three points at regular intervals in the circumferential direction on the outer circumference of the diaphragm unit 112'. A connection pin 112a' is coupled with the inner circumference of the damping rubber 11, and the outer circumference of the damping rubber 11 contacts a cylindrical holder 20 at both ends in the circumferential direction.

FIG. 9C illustrates the damping rubber 11 according to this embodiment. The damping rubber 11 basically has a shape similar to that of the damping rubber 1 according to the first embodiment. In other words, the damping rubber 11 includes two leg-shaped contacting portions 11a that contact the holder 20 at different positions, and a flexible member 11c that extends between the contacting portions 11a and is distant via the space S from the holder 20 and the diaphragm unit 112'. The damping rubber 11 further includes a connecting concave portion 11b with which the diaphragm unit 112' (connection pin 112a') is coupled at a position different from the position of the contacting portion 11a in the longitudinal direction in which the flexible member 11c extends. The damping effect of the damping rubber 11 is similar to that of the damping rubber 1 according to the first embodiment.

This embodiment disposes the damping rubber on the outer circumference of the diaphragm unit 112', and the holder 20 on the outer circumference of the damping rubber 11. In other words, the diaphragm unit 112', the damping rubber 11, and the holder 20 are aligned with one another in the radial direction orthogonal to the optical axis direction. This configuration can avoid a length of the interchangeable lens from increasing in the optical axis direction, and provide the damping rubber 11 having a high damping effect.

Third Embodiment

Figure 10:
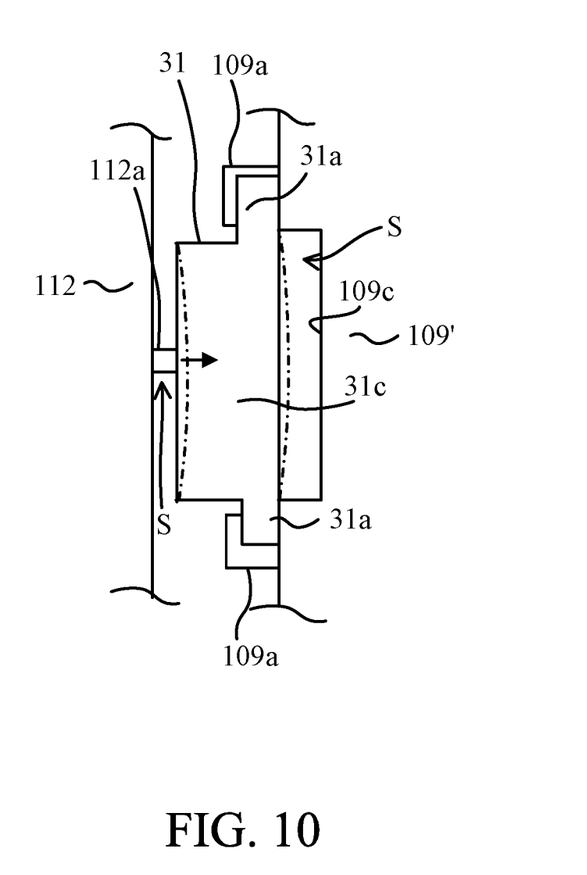
FIG. 10 is a sectional view of a diaphragm unit holding configuration according to a third embodiment.

FIG. 10 illustrates a diaphragm unit holding configuration according to a third embodiment of the present invention. In the first and second embodiments, the contacting portions 1a and 11a in the damping rubbers 1 and 11 have leg shapes that extend toward the holders 109 and 20 relative to the flexible members 1c and 11c, and form the space S between the flexible member and the holder.

However, as in a damping rubber 31 illustrated in FIG. 10, a contacting portion 31a may not project toward the holder (the 3b-th unit holding frame 109') relative to the flexible member 31c and part of the 3b-th unit holding frame 109' opposite to the flexible member 31c may have a concave portion 109c to form the space S. In this case, the flexible member 31c can bend due to the vibration of the diaphragm unit 112 as illustrated by a long dashed double-short dashed line, and can provide a high damping effect.

While each embodiment discusses the diaphragm unit as an example of the electric type optical unit, the damping rubber (elastic member) described in each embodiment may be used for an optical unit, such as an image blur correction unit, other than the diaphragm unit.

According to each embodiment, a flexion of the flexible member of the elastic member can absorb the vibrations caused by driving the optical unit and restrain the noises from being generated by the vibrations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-032706, filed Feb. 24, 2016, which is hereby incorporated by reference herein in its entirety.

What is claimed is:

1. An optical apparatus comprising:
   an optical unit including a movable member and an actuator that drives the movable member;
   a holder configured to hold the optical unit; and
   an elastic member that has a first contacting portion and a second contacting portion each contacting the holder, and a flexible portion provided between the first and second contacting portions and connected to the optical unit,
   wherein the flexible portion is connected to the optical unit at a connection position such that a first space is formed between the flexible portion and the optical unit, and a second space is formed between the flexible portion and the holder so as to include an opposite position to the connection position.

2. The optical apparatus according to claim 1, wherein the holder holds the first contacting portion and the second contacting portion in two orthogonal directions including an optical axis direction of the optical apparatus and a direction orthogonal to the optical axis direction, and
   wherein the elastic member has a space in the two directions.

3. The optical apparatus according to claim 2, wherein the holder includes:
   a first holder including a first receiving portion into which the first contacting portion is inserted in the optical axis direction and a second receiving portion into which the second contacting portion is inserted in the optical axis direction; and
   a second holder coupled with the first holder so as to shield the first receiving portion and the second receiving portion.

4. The optical apparatus according to claim 1, wherein the optical unit, the elastic member, and the holder are arranged in an optical axis direction of the optical apparatus.

5. The optical apparatus according to claim 1, wherein the optical unit, the elastic member, and the holder are arranged in a direction orthogonal to an optical axis direction of the optical apparatus.

6. The optical apparatus according to claim 1, wherein a resonance magnification of the elastic member for a frequency higher than 200 Hz is smaller than that for a frequency lower than 200 Hz.

7. The optical apparatus according to claim 1, wherein the optical unit is a diaphragm unit configured to adjust a light quantity by driving a light-shielding member as the movable member via the actuator.

8. The optical apparatus according to claim 1,
   wherein the optical unit includes at least one optical member as the movable member configured to move in a direction perpendicular to a predetermined axis by the actuator, and
   wherein the elastic member is disposed at a position that shifts from the optical unit in the direction perpendicular to the predetermined axis.

9. The optical apparatus according to claim 1,
   wherein the optical unit includes at least one optical member as the movable member configured to move in a direction perpendicular to a predetermined axis by the actuator, and
   wherein the elastic member is disposed at a position that shifts from the holder in the direction perpendicular to the predetermined axis.

10. The optical apparatus according to claim 1,
    wherein the optical unit includes at least one optical member as the movable member configured to move in a direction perpendicular to a predetermined axis by the actuator, and
    wherein the predetermined axis is parallel to an optical axis of the optical apparatus.

* * * * *